US 6,582,187 B1

(12) United States Patent
Shockley et al.

(10) Patent No.: US 6,582,187 B1
(45) Date of Patent: Jun. 24, 2003

(54) METHODS AND APPARATUS FOR ISOLATING GAS TURBINE ENGINE BEARINGS

(75) Inventors: Robert Edwin Shockley, Lynnfield, MA (US); Gary Charles Liotta, Beverly, MA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/522,562

(22) Filed: Mar. 10, 2000

(51) Int. Cl.[7] ............................................. F01D 25/16
(52) U.S. Cl. ........................................ 415/111; 415/229
(58) Field of Search ................................. 415/111, 112, 415/180, 175, 177, 178, 229

(56) References Cited

U.S. PATENT DOCUMENTS

| 2,469,732 A | * | 5/1949 | Kalitinsky ................... 415/112 |
| 2,620,123 A | * | 12/1952 | Parducci ................... 415/175 X |
| 2,788,951 A | * | 4/1957 | Flint .......................... 415/112 |
| 3,133,693 A | * | 5/1964 | Holl ........................ 415/112 X |
| 3,393,024 A | * | 7/1968 | Rhodes et al. ........... 415/112 X |
| 3,531,167 A | * | 9/1970 | Edge et al. .................. 384/475 |
| 3,673,802 A | * | 7/1972 | Krebs et al. .............. 415/79 X |
| 3,734,649 A | * | 5/1973 | Sandy, Jr. ................... 415/143 |
| 3,764,236 A | * | 10/1973 | Carter ........................ 415/104 |
| 3,903,690 A | * | 9/1975 | Jones ..................... 415/112 X |
| 3,909,085 A | * | 9/1975 | Wilkinson et al. ........... 384/517 |
| 3,925,979 A | * | 12/1975 | Ziegler ................... 415/176 X |
| 3,951,573 A | * | 4/1976 | Dunning et al. ............. 415/104 |
| 4,222,705 A | * | 9/1980 | Smith ......................... 415/114 |
| 4,500,143 A | * | 2/1985 | Kervistin et al. ....... 415/180 X |
| 4,653,267 A | * | 3/1987 | Brodell et al. ............. 60/39.02 |
| 4,709,545 A | * | 12/1987 | Stevens et al. ............ 60/39.08 |
| 5,046,920 A | * | 9/1991 | Higashi et al. ......... 415/111 X |
| 5,160,251 A | | 11/1992 | Ciokajlo |
| 5,232,335 A | * | 8/1993 | Narayana et al. ........... 415/115 |
| 5,438,756 A | | 8/1995 | Halchak et al. |
| 5,555,721 A | | 9/1996 | Bourneuf et al. |
| 5,611,661 A | * | 3/1997 | Jenkinson ................... 415/112 |
| 5,619,850 A | * | 4/1997 | Palmer et al. ............. 60/39.02 |
| 6,048,101 A | | 4/2000 | Rasmussen |
| 6,053,701 A | * | 4/2000 | Ichiryu et al. .............. 415/115 |

* cited by examiner

Primary Examiner—Edward K. Look
Assistant Examiner—Dwayne J. White
(74) Attorney, Agent, or Firm—Rodney M. Young; Armstrong Teasdale LLP

(57) ABSTRACT

A gas turbine engine including a rotor shaft includes a bearing isolation system including an isolation shaft and a pair of pilots. The pilots are disposed between the isolation and rotor shafts and connect the isolation shaft to the rotor shaft to form a gap between the isolation and rotor shafts. The pilots are positioned axially along the rotor shaft and permit the isolation shaft to move axially with respect to the rotor shaft. Each pilot includes a plurality of openings to permit cooling air to flow within the gap defined between the isolation shaft and the rotor shaft.

20 Claims, 2 Drawing Sheets

METHODS AND APPARATUS FOR ISOLATING GAS TURBINE ENGINE BEARINGS

GOVERNMENT RIGHTS STATEMENT

The United States Government has rights in this invention pursuant to Contract No. DAAH10-98-C-0023.

BACKGROUND OF THE INVENTION

This application relates generally to gas turbine engines and, more particularly, to gas turbine engine bearing assemblies.

A gas turbine engine typically includes a multi-stage axial compressor, a combustor, and a turbine. Airflow entering the compressor is compressed and directed to the combustor where it is mixed with fuel and ignited, producing hot combustion gases used to drive the turbine. The turbine is coupled to the compressor with a rotor shaft supported by a plurality of assemblies. As a result of hot combustion gases, the turbine, and rotor shaft are subjected to thermal stresses. Additionally, the bearing assemblies supporting the rotor shaft are, subjected to thermal conduction from contact with the rotor shaft.

As turbine engines have evolved, higher stage loading turbo-machinery, including larger bearing assemblies and rotor shafts, have been included within the engines to provide increased pressure ratio cycles for the turbine engines. Higher pressure ratios increase cycle temperatures and air temperatures within the engine. Specifically, higher stage loading causes an operating speed of the turbines to increase, resulting in temperature increases in the rotor and bearing assemblies.

To minimize the effects of increased pressure ratio cycles, known bearing assemblies include isolation systems that attempt to isolate the bearing assemblies from the rotor shaft. Isolation systems often include shaft oil cooling systems, increased bearing compliance or trilobing, reduced inner race to shaft fits, and decreased bearing support stiffness'. Other isolation systems have included bearing assemblies fabricated from various materials. Often such isolation systems result in only minimal operating life extensions of the bearings for increased pressure ratio cycles. As a result, the bearing systems have not been effectively isolated from the effects of the rotor shaft.

BRIEF SUMMARY OF THE INVENTION

In an exemplary embodiment, a gas turbine engine includes a bearing isolation system that effectively isolates bearing assemblies from rotor shafts. The bearing isolation system includes an isolation shaft and a pair of pilots. The gas turbine engine includes a compressor impeller and a turbine assembly. One of the pilots is disposed a distance upstream from the bearing assemblies between the isolation shaft and the rotor shaft, and one of the pilots is disposed a distance downstream from the bearing assemblies between the isolation shaft and the rotor shaft. The isolation shaft is connected to the rotor shaft with the pilots and is disposed between the bearing assemblies and the rotor shaft such that an air gap is created between the isolation shaft and the rotor shaft. The bearing assemblies are mounted to the isolation shaft. The pilots are positioned axially along the rotor shaft and during engine operation, permit the isolation shaft to move axially with respect to the rotor shaft. Additionally, each pilot includes a plurality of openings to permit cooling air to flow within the gap defined between the isolation shaft and the rotor shaft.

During operation, cooling air is channeled through the pilot openings and into the gap disposed between the isolation shaft and the rotor shaft. The cooling air reduces heat transfer from the rotor shaft to the bearing assemblies and reduces an operating temperature of the isolation shaft and rotor shaft. Because the isolation shaft is connected to the rotor shaft with only the pair of pilots, direct heat conduction between the bearing assemblies and the rotor shaft is reduced in comparison to known bearing assemblies including bearings coupled directly adjacent a rotor shaft. Furthermore, because the pilots are spaced a distance from either side of the bearing, thermal and mechanical growth of the compressor impeller and turbine assembly is attenuated along the isolation shaft prior to reaching the bearing assemblies. As a result, thermal and mechanical growth of the bearing assembly is reduced, thus extending the operating life of the bearing assembly. Additionally, the pilots create thermal resistance between the rotor shaft and the isolation shaft to attenuate heat conduction between the rotor shaft and bearing inner races. As a result, the bearing assemblies are effectively isolated from the rotor shaft and mechanical capability and durability of each bearing assembly is improved.

DETAILED DESCRIPTION OF THE INVENTION

Figure 1:
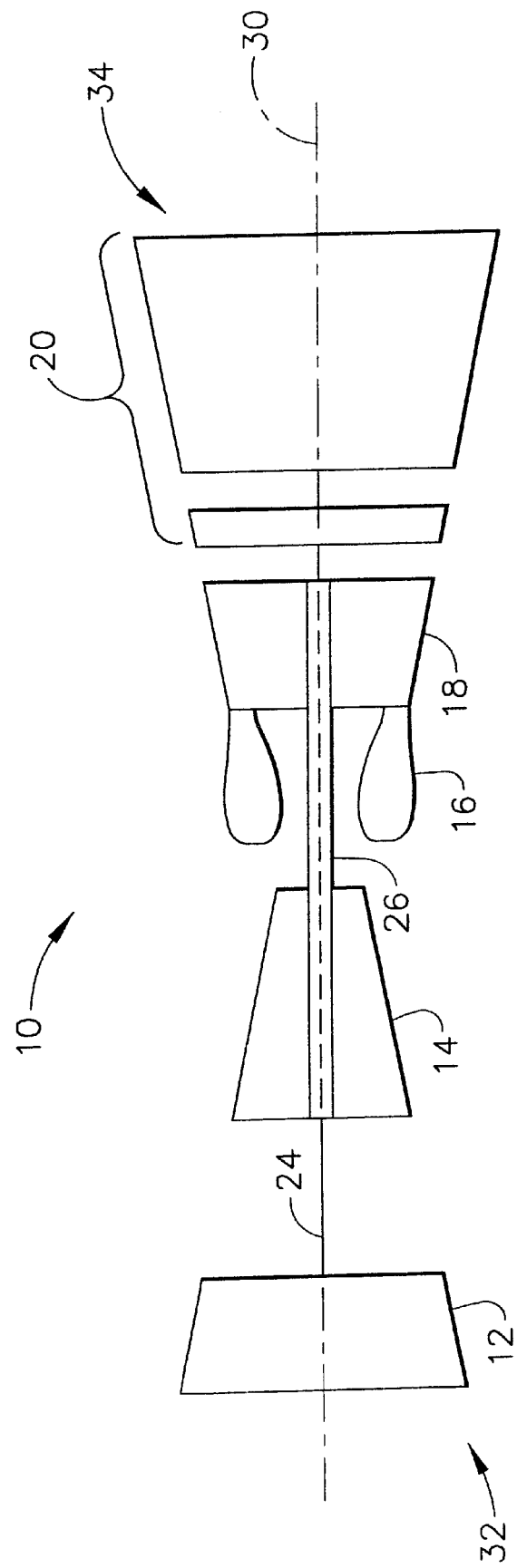
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18, and a low pressure turbine 20. Compressor 12 and turbine 20 are coupled by a first shaft 24, and compressor 14 and turbine 18 are coupled by a second shaft 26. Engine 10 has an axis of symmetry 30 extending from an inlet side 32 of engine 10 aftward to an exhaust side 34 of engine 10. Shafts 24 and 26 rotate about axis of symmetry 30. In one embodiment, engine 10 is a JTAGG III engine available from General Electric Aircraft Engines, Cincinnati, Ohio.

In operation, air flows through low pressure compressor 12 from an inlet side 32 of engine 10 and compressed air is supplied from low pressure compressor 12 to high pressure compressor 14. Compressed air is then delivered to combustor 16 and airflow from combustor 16 drives turbines 18 and 20.

Figure 2:
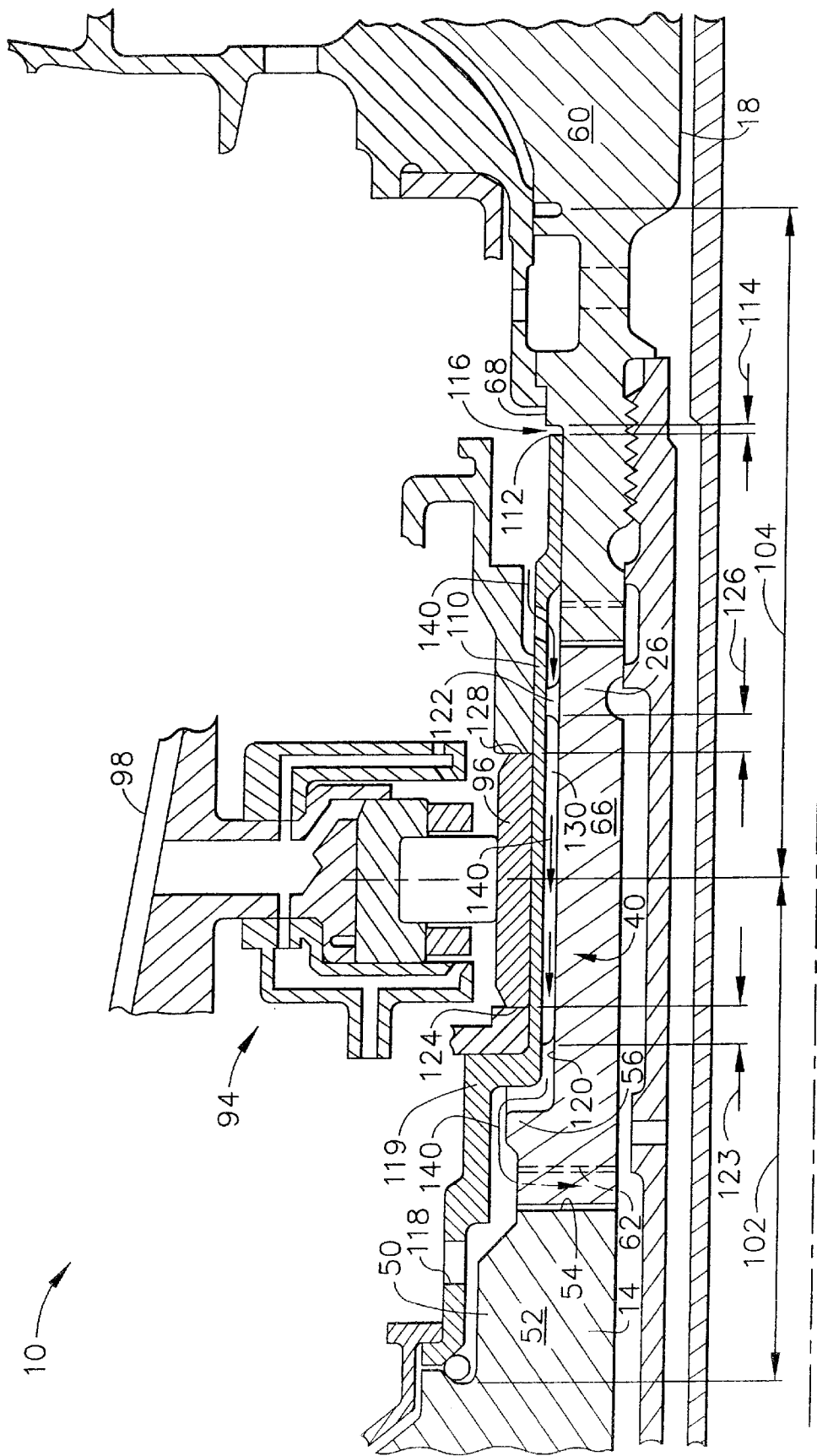
FIG. 2 is a side cross-sectional schematic illustration of a bearing isolation system included in the gas turbine engine shown in FIG. 1.

FIG. 2 is a side cross-sectional schematic illustration of a bearing isolation system 40 included in gas turbine engine 10. Engine 10 includes main shaft 26, compressor 14, and high pressure turbine 18. Compressor 14 includes a plurality of blades (not shown) and an impeller disc 50. Impeller 50 extends aftward from compressor 14 downstream of the blades and is rotatably coupled to main shaft 26. In one embodiment, impeller 50 is a single stage centrifugal impeller.

Impeller 50 includes a body 52 between the blades to a trailing edge 54. Trailing edge 54 is disposed adjacent a shoulder 56 extending from shaft 26. Body 52 includes a bleed air opening (not shown) to permit cooling air to be extracted from compressor 14 for cooling turbine 18.

Turbine 18 is rotatably coupled co-axially to compressor 14 with shaft 26 and is disposed downstream from compressor 14. Turbine 18 includes a stator assembly (not shown) and a rotor disc assembly 60. Rotor assembly 60 may include a plurality of rotors (not shown).

Shaft 26 includes an upstream end 62, a downstream end 64 and a body 66 extending between upstream end 62 and downstream end 64. Upstream end 62 is coupled to compressor impeller 50 and downstream end 64 is coupled to turbine 18. Shoulder 56 extends radially outward from shaft 26 adjacent upstream end 62. Body 66 extends axially from shoulder 56 to downstream end 64. A second shoulder 68 extends radially outward from turbine rotor disc 60 adjacent downstream end 64. Shaft 26 is annular and body 66 is substantially planar between shoulders 56 and 68.

A bearing assembly 94 is rotatably coupled to shaft 26 between shoulders 56 and 68. Bearing assembly 94 includes an inner race 96 rotatably coupled to rotor shaft body 66 and circumferentially disposed around rotor shaft 26. Bearing assembly 94 secures shaft 26 to engine 10 adjacent a casing 98 under combustor 16. Inner race 96 is separated from impeller and turbine discs 50 and 60, respectively, by a distance 102 and 104, respectively. In one embodiment, distance 102 is approximately 2.0 inches and distance 104 is approximately 2.5 inches.

Bearing isolation system 40 includes an isolation shaft 110 disposed between bearing assembly 94 and rotor shaft 26. Isolation shaft 110 is disposed between rotor shaft shoulders 56 and 68 and anti-rotated with a tang (not shown) extending to a slot (not shown) in shoulder 68. A trailing edge 112 of isolation shaft 110 is disposed a distance 114 from shoulder 68. Distance 114 creates a gap 116 between isolation shaft 110 and shoulder 68. Between a leading edge 118 and trailing edge 112, isolation shaft 110 generally conforms to rotor shaft 26 and includes a shoulder 119. Shoulder 119 is disposed radially inward from shaft shoulder 56 and permits isolation shaft leading edge 118 to extend upstream beyond rotor shaft upstream end 62.

A pair of pilots 120 and 122 connect isolation shaft 110 to rotor shaft 26. Pilot 120 is positioned a distance 123 upstream from an upstream side 124 of bearing assembly 94 between isolation shaft 110 and rotor shaft 26, and adjacent rotor shaft shoulder 56. Pilot 122 is positioned a distance 126 downstream from a downstream side 128 of bearing assembly 94 between isolation shaft 110 and rotor shaft 26. Pilots 120 and 122 include a plurality of openings (not shown) to permit cooling air to flow through pilots 120 and 122 into a gap 130 created between isolation shaft 110 and rotor shaft 26. In one embodiment, pilots 120 and 122 are interference fit between isolation shaft 110 and rotor shaft 26 and bearing inner race 96 is interference fit to isolation shaft 110.

During operation, air enters compressor 14 and is compressed by the plurality of compressor stages prior to entering impeller 50. The compressed air exits impeller 50 and is mixed with fuel and ignited to produce hot combustion gases. The resulting hot combustion gases drive turbines 18 (shown in FIG. 1) and 20. Simultaneously, a portion of the air is extracted from impeller 50 for use as cooling air 140.

Cooling air 140 extracted from impeller 50 is cooled and channeled aftward inside casing 98. After flowing along oil seals (not shown), cooling air 140 is channeled through the plurality of openings in pilot 122. Cooling air 140 flows through the openings disposed within pilot 122 into gap 130 disposed between isolation shaft 110 and rotor shaft 26. Cooling air 140 exits gap 130 through the plurality of openings disposed within pilot 120 and is directed radially inward towards impeller/turbine bore 100 through a plurality of openings (not shown) disposed in impeller 50.

Cooling air 140 reduces an operating temperature of bearing assembly 94. Because cooling air 140 flows through gap 130, heat transfer from rotor shaft 26 to bearing assembly 94 is reduced. Furthermore, pilots 120 and 122 are a distance 123 and 126, respectively, from bearing assembly 94, and bearing inner race 96 is not mounted directly adjacent rotor shaft 26. As a result, areas of contact subject to direct thermal conduction between rotor shaft 26 and bearing inner race 96 are reduced in comparison to bearing assemblies including bearings coupled directly adjacent rotor shafts. Furthermore, pilots 120 and 122 create thermal resistance between rotor shaft 26 and isolation shaft 110. Such thermal resistance permits isolation shaft 110 to attenuate heat conduction between rotor shaft 26 and bearing inner race 96. Furthermore, the combination of pilots 120 and 122 and distances 123 and 126 cause thermal and mechanical growth of impeller 50 and turbine rotor disc assembly 60 along a length of isolation shaft 110 to be attenuated prior to reaching bearing inner race 96. As a result, thermal and mechanical growth of inner race 96 is reduced and operating bearing life is increased. Additionally, gap 116 disposed adjacent isolation shaft trailing edge 112 permits isolation shaft 110 to move axially during operation of engine 10. As a result, during engine operation, isolation shaft 110 may thermally and mechanically expand as heat conduction is attenuated.

In addition, bearing isolation system 40 in combination with rotor disc assembly 60 permit a radial spring rate of rotor shaft 26 to be reduced in comparison to engines 10 operating excluding bearing isolation system 40. Furthermore, higher rotor bending frequencies and lower rotor translation frequencies relative to engine operating speeds are permitted.

The above-described bearing isolation system is cost-effective and highly reliable. The bearing isolation system includes an isolation shaft and a pair of pilots. The pilots are positioned a distance from the bearing assemblies and permit the isolation shaft to connect to the rotor shaft. The isolation shaft is disposed between the bearing assemblies and the rotor shafts and is positioned such that a gap is created between the isolation shaft and the bearing inner races. Cooling air flows through openings in the pilots into the gap and reduces thermal conduction between the rotor shaft and the bearing assemblies. Additionally, the pilots and isolation shaft are positioned such that the isolation shaft may move axially during engine operation. As a result, a cost-effective and reliable bearing isolation system is provided. Furthermore, because the pilots are spaced a distance from either side of the bearing, thermal and mechanical growth of the compressor impeller and turbine assembly is attenuated along the isolation shaft prior to reaching the bearing assemblies. As a result, thermal and mechanical growth of the bearing assembly is reduced, thus extending the operating life of the bearing assembly.

While the invention has been described in terms of various specific embodiments, those skilled in the art will recognize that the invention can be practiced with modification within the spirit and scope of the claims.

What is claimed is:

1. A method of reducing thermal conduction between a turbine engine rotor shaft and a bearing assembly using a bearing isolation system, the bearing isolation system including a shaft disposed a distance from the rotor shaft and between the turbine rotor shaft and the bearing, the bearing isolation system shaft including a plurality of pilots disposed between the turbine rotor shaft and the bearing assembly, said method comprising the steps of:

operating the turbine engine; and directing cooling air into a gap defined between the bearing isolation system shaft and the turbine rotor shaft.

2. A method in accordance with claim 1 wherein the plurality of pilots include a plurality of openings, said step of directing cooling air further comprising the step of directing cooling air through the plurality of pilot openings into the gap disposed between the turbine rotor shaft and the bearing isolation system shaft.

3. A method in accordance with claim 2 wherein the step of operating the turbine engine further comprises the step of permitting the bearing isolation system shaft to move axially with respect to the turbine rotor shaft during engine operation.

4. A method in accordance with claim 3 wherein said step of directing cooling air further comprises the step of directing cooling air through a plurality of pilot openings disposed in a pilot disposed downstream of the bearing and through a plurality of pilot openings disposed in a pilot disposed upstream of the bearing.

5. A bearing isolation system for a gas turbine engine including a main rotor shaft including at least one rotor, and a bearing rotatably coupled to the main rotor shaft, said bearing isolation system comprising a shaft disposed between the main rotor shaft and the bearing, said bearing isolation system shaft connected to the bearing and configured to isolate the bearing from the main rotor shaft, said main rotor shaft and said bearing isolation system shaft defining a gap coupled in flow communication with an air source for receiving cooling air therethrough for cooling said bearing.

6. A bearing isolation system in accordance with claim 5 further comprising a plurality of pilots disposed between said bearing isolation system shaft and the main rotor shaft.

7. A bearing isolation system in accordance with claim 6 wherein said plurality of pilots create a thermal barrier to reduce conduction of heat to the bearing from the main rotor shaft.

8. A bearing isolation system in accordance with claim 7 wherein the bearing is interference fit on said bearing isolation system shaft.

9. A bearing isolation system in accordance with claim 8 wherein at least one of said plurality of pilots disposed a distance upstream from the bearing, at least one of said plurality of pilots disposed a distance downstream from the bearing.

10. A bearing isolation system in accordance with claim 9 wherein each of said plurality of pilots comprises a plurality of openings.

11. A bearing isolation system in accordance with claim 10 wherein said bearing isolation system shaft is disposed a distance from the main rotor shaft such that said bearing isolation system and the main rotor shaft define a gap, the plurality of pilot openings configured to permit cooling air to flow into said gap between said bearing isolation system shaft and the main rotor shaft.

12. A bearing isolation system in accordance with claim 11 wherein said bearing isolation system shaft is configured to move axially with respect to the main rotor shaft.

13. A gas turbine engine rotor assembly comprising:

a first rotor comprising a rotor shaft;

at least one bearing rototably coupled to said rotor shaft; and a bearing isolation system configured to isolate said bearing from said rotor shaft, said bearing isolation system comprising a bearing isolation system shaft disposed between said rotor shaft and said bearing, said bearing isolation system shaft coupled to an air source for receiving cooling air to facilitate reducing conduction of heat to said bearing.

14. A rotor assembly in accordance with claim 13 wherein said bearing isolation system shaft is disposed a distance from said rotor shaft.

15. A rotor assembly in accordance with claim 14 wherein said bearing isolation system further comprises a plurality of pilots disposed between said bearing isolation system shaft and said rotor shaft.

16. A rotor assembly in accordance with claim 15 wherein said bearing isolation system plurality of pilots create a thermal barrier to reduce conduction of heat to said bearing from said rotor shaft.

17. A rotor assembly in accordance with claim 16 wherein at least one of said plurality of pilots disposed a distance upstream from said bearing and at least one of said plurality of pilots disposed a distance downstream from said bearing.

18. A rotor assembly in accordance with claim 17 wherein said plurality of pilots comprise a plurality of openings configured to permit cooling air to flow between said bearing isolation system shaft and said rotor shaft.

19. A rotor assembly in accordance with claim 18 wherein said plurality of pilots configured to attenuate thermal and mechanical growths of said first rotor such that thermal and mechanical growths of said bearing assembly are reduced.

20. A rotor assembly in accordance with claim 19 wherein said bearing isolation system shaft configured to move axially with respect to said rotor shaft, said bearing isolation system configured with said first rotor to reduce a radial spring rate of said rotor shaft.

* * * * *